Aug. 7, 1962   A. E. CHANDLER   3,048,189
VACUUM SAFETY DEVICE FOR TANKS AND THE LIKE
Filed Dec. 14, 1959
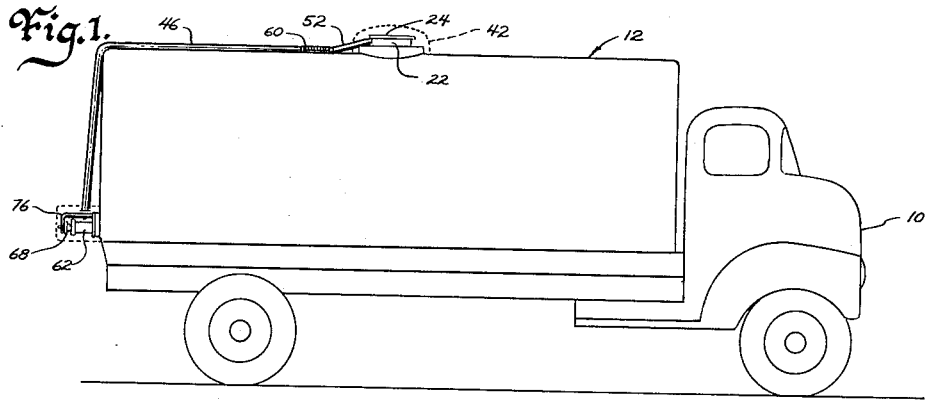
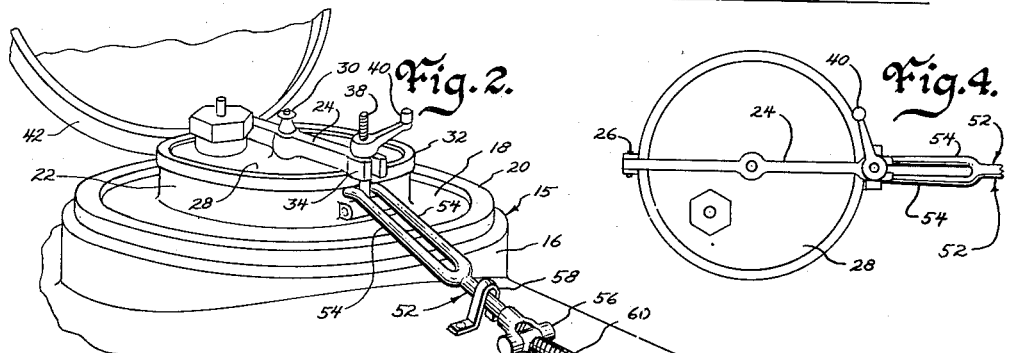
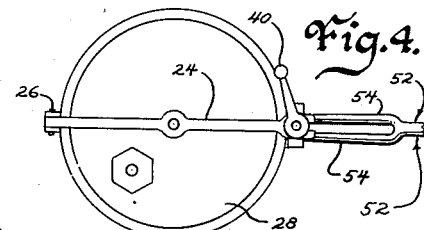
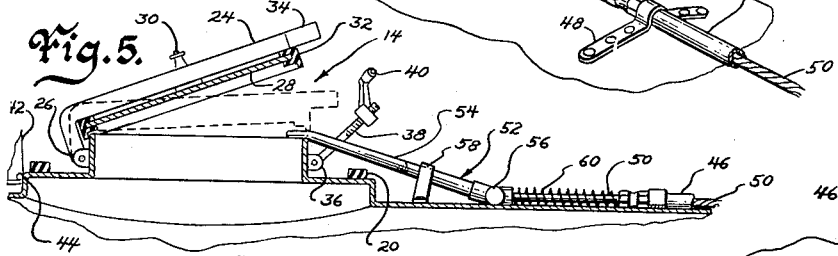
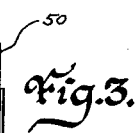
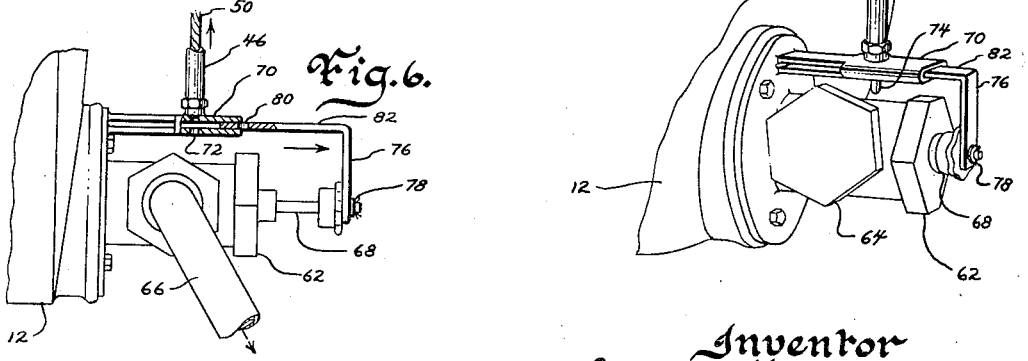
Witness
Edward P. Seeley
Inventor
Arthur E. Chandler
by Donald H. Zarley
Attorney United States Patent Office 3,048,189
Patented Aug. 7, 1962

3,048,189
VACUUM SAFETY DEVICE FOR TANKS AND THE LIKE
Arthur E. Chandler, 1010 W. Bremer Ave., Waverly, Iowa
Filed Dec. 14, 1959, Ser. No. 859,318
5 Claims. (Cl. 137—586)

My invention relates to safety control means and more particularly to a safety device to protect tanks and the like from the adverse effects of a vacuum.

Milk transport tanks which are mounted on the chassis of large transport trucks are generally equipped with a manhole in the top thereof and a valve means near the bottom thereof. The manhole is used to introduce milk into the tank and the valve mechanism is used to pump the milk from the tank when the truck has arrived at a milk processing depot.

A hose is customarily secured to the above mentioned valve means to connect the valve with the pump unit. The manhole is normally opened at that point to prevent a vacuum from being created in the tank as the pump unit withdraws the milk from the tank. However, sometimes the operator forgets to open the manhole or on other occasions the manhole becomes inadvertently closed after it has been opened. Either of these happenings will cause a vacuum to be created within the tank as the pump continues to withdraw the milk from the tank. The unfortunate result flowing from the creation of this vacuum is the ultimate collapse of the tank.

Therefore, the principal object of my invention is to provide a vacuum safety device for tanks and the like which will not permit the creation of a vacuum within the tank while fluid is being withdrawn therefrom.

A further object of my invention is to provide a vacuum safety device for tanks and the like which will not permit the removal of fluid from a tank until the manhole has been opened and the "seal" on the tank has been broken.

A still further object of my invention is to provide a vacuum safety device for tanks and the like which will not permit the manhole to re-seal the tank while fluid is being withdrawn therefrom.

A still further object of my invention is to provide a vacuum safety device for tanks and the like which will not in any way impair the sanitation conditions within the tank.

A still further object of my invention is to provide a vacuum safety device for tanks and the like which cannot have its function impaired by ice, snow, or other climatic conditions.

A still further object of my invention is to provide a vacuum safety device for tanks and the like which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side elevational view of my device mounted on a truck-tank transport;

FIG. 2 is a perspective view of my device at the point where it is secured to the closed manhole cover;

FIG. 3 is a perspective view of the valve mechanism in its locked position;

FIG. 4 is a partial plan view of my device as shown in FIG. 2;

FIG. 5 is a side elevational view of my device at the point where it is secured to the manhole cover when the manhole cover is in an opened condition; and FIG. 6 is a side elevational view of the valve mechanism in its opened condition.

I have used the numeral 10 to generally designate a transport truck with a conventional tank 12 mounted thereon. Tank 12 has a conventional manhole opening 14 located on the top and in the center thereof. The manhole structure 15 which surrounds the manhole opening 14 is comprised of a plurality of elements. A circular shoulder 16 is welded or otherwise secured to the top of tank 12 and a flat top portion 18 extends over the top of this circular shoulder. A circular resilient gasket of rubber or the like 20 is secured in any convenient manner to the top portion 18 of circular shoulder 16. As clearly shown in FIGS. 2 and 5, a second circular shoulder 22 is welded or otherwise secured to the top portion 18 of circular shoulder 16. As shown in FIG. 5, an L-shaped bar 24 is pivotally secured to the outside vertical surface of circular shoulder 22 by means of hinge 26. L-shaped bar 24 is of such dimensions and proportions that it is permitted to extend horizontally over circular shoulder 22 when in its lowered position and the bar is shown to be in this position as depicted in FIG. 2. A lid 28 is secured to the bottom of bar 24 by means of clasp element 30. A circular gasket 32 is secured in any convenient manner to the periphery of the circular lid 28. The size of the circular lid 28 and its position on bar 24 are such that the lid and the circular gasket 32 will register with the circular shoulder 22 when the bar 24 is in its lowered position. This relationship between lid 28 and the circular shoulder 22 is depicted in FIG. 2. The end of bar 24 opposite to hinge 26 is split to form two spaced apart ear portions 34. It is preferred that bar 24 be adapted to pivot in a vertical plane passing through the longitudinal axis of the tank 12.

A horizontal pin 36 is pivotally secured to the vertical side of circular shoulder 22 at a point opposite the location of hinge 26. A threaded bolt 38 is welded or otherwise secured to pin 36 and extends at right angles away from the pin as shown in FIGS. 2 and 5. The threaded bolt 38 is of such length that it can be pivoted upwardly by means of pin 36 and be received between the spaced apart ears 34 on bar 24. A crank 40 is threadedly secured to the upper end of bolt 38 and is adapted to forcibly hold the bar 24, lid 28 and circular gasket 32 in binding relationship with the top of circular shoulder 22. A cover 42 is hinged to the circular shoulder 16 at 44 and is adapted to enclose the entire manhole structure 15 at times.

An elongated tubular conduit 46 is secured to tank 12 by means of brackets 48 and extends away from the manhole structure 15 toward one end of tank 12 and thence extends downwardly over the end of tank 12 to a point just above the bottom of the tank. An elongated cable 50 is movably supported within conduit 46. As shown in FIGS. 2 and 5, conduit 46 terminates at a point slightly removed from the manhole structure 15 and cable 50 protrudes slightly beyond conduit 46 in a direction toward the manhole structure. A fork element 52 having two elongated prongs 54 is pivotally secured to the end of cable 50 by means of hinge element 56 in such a manner that the prongs 54 extend toward and engage the manhole structure 15. The prongs 54 are adapted to receive threaded bolt 38 therebetween at times as shown in FIG. 2. An inverted U-shaped bracket 58 extends over fork element 52 and is secured to tank 12 in any convenient manner to limit the upward movement of the fork with respect to the tank. A spring element 60 embraces the portion of cable 50 that protrudes from conduit 46 and spring element 60 spans the distance between the end of the conduit and the hinge element 56. It should be noted that the distance between the hinge 56 and the end of conduit 46 will determine the state of expansion or contraction that spring 60 has been subjected to. It also should be noted that the extreme tips of the prongs 54 are bent downwardly to a small extent as shown in FIGS. 2 and 5.

A conventional valve 62 is mounted on the end of tank 12 in any convenient manner. Valve 62 has an outlet opening, not shown, which is adapted to receive an outlet plug 64. A hose connection 66, which in turn is secured to a pump unit, is adapted to be connected to the outlet opening in the valve when the outlet plug 64 is removed therefrom. The valve 62 is opened and closed by means of a piston 68 which is slidably mounted in conventional fashion within the valve. When the piston 68 is moved outwardly from the valve in the direction of the arrow shown in FIG. 6, the valve is opened and fluid is permitted to flow from the tank, through the valve, and into the hose 66. When the piston 68 is forced back into the valve 62, as depicted in FIG. 3, the valve is thereupon closed and fluid cannot flow from the tank through the valve.

A horizontally disposed flat hollow bar 70 extends from tank 12 directly over valve 62. The lower end of conduit 46 can be secured to hollow bar 70 in any convenient manner as shown in FIG. 3. As shown in FIG. 6, hollow bar 70 has a circular aperture 72 extending therethrough directly below conduit 46. Aperture 72 is adapted to receive a locking pin 74 which is secured to the lower end of cable 50 in any convenient manner. An L-shaped bracket 76 is secured to the outer end of piston 68 in any convenient manner such as the stud bolt and cotter key assembly 78 shown in FIGS. 3 and 6. The L-shaped bracket 76 is of such dimensions that its horizontal portion is adapted to be slidably received into the interior of hollow bar 70. An aperture 80 in the horizontal portion 82 of bracket 76 is adapted to register with the aperture 72 in hollow bar 70 when the piston 68 is in its withdrawn or closed position in valve 62. The length of cable 50 is such that when the prongs 54 of fork 52 engage the outer surface of circular shoulder 22 as shown in FIG. 2, the pin 74 on the lower end of cable 50 will penetrate through the aperture 72 in hollow bar 70.

The normal operation of my device is as follows. When the tank 12 is loaded with fluid and is being transported from one point to another, the manhole structure 15 is closed as is the valve 62. As described above, the valve 62 is closed by manually pushing the piston 68 inwardly into the valve. This inward movement of piston 68 will cause the aperture 80 in bracket 76 to register with the aperture 72 in the hollow bar 70. The manhole structure is closed by forcing fork 52 toward conduit 46 to compress spring 60. This movement of fork 52 is continued until the outer tips of the prongs 54 engage the exterior surface of the circular shoulder 22 as shown in FIG. 2. This movement of the fork 52 forces the cable 50 downwardly through conduit 46 so that the pin 74 on the lower end of the cable will move through the registering apertures 72 and 80 in hollow bar 70 and bracket 76, respectively. When the fork 52 is in the above described position, the L-shaped bar 24 and lid 28 are pivoted downwardly to engage the top of circular shoulder 22. Threaded bolt 38 is pivoted upwardly between the spaced apart ears 34 on the end of L-shaped bar 24 and crank 40 can then be moved downwardly on bolt 38 to bind the bar 24, the lid 28 and the circular gasket 32 against the top of circular shoulder 22. This action seals the tank 12. The cover 42 can thereupon be pivoted downwardly to engage the circular gasket 20 and any satisfactory means can be used to keep the cover in this position.

When the pin 74 on the lower end of cable 50 has dropped through the registering apertures 72 and 80 in hollow bar 70 and bracket 76, respectively, the piston 68 cannot be withdrawn from the valve 62 and the valve cannot therefore be opened to permit the pumping operation to take place. The only way to withdraw the pin 74 from the aperture 80 in bracket 76 is to move the fork 52 toward the manhole structure 15. However, when the manhole structure 15 is in its closed condition, as described above, the outer ends of the prongs 54 of fork 52 are being urged against the exterior side of circular shoulder 22 by spring 60 and are further held against movement by the lid 28, gasket 32, and bolt 38 as shown in FIG. 2. Therefore, the only way to displace the fork 52 is to open the manhole structure 15.

The cover 42 can be retracted to a position shown in FIG. 2 and the crank 40 can be disengaged so that bolt 38 can pivot downwardly away from the spaced apart ears 34 on the end of bar 24. This will permit the bar 24 and the lid 28 to be pivoted upwardly as shown in FIG. 5. This action will permit the spring 60 to force the prongs 54 of fork 52 to a position over and above the top of shoulder 22. This displacement of fork 52 will slightly withdraw the cable 50 from the conduit 46 which in turn will withdraw the pin 74 from the registering apertures 72 and 80 in hollow bar 70 and bracket 76, respectively. This will permit the piston 68 to be withdrawn from the valve 62 and the valve 62 can thereupon be opened and the pumping operation can begin. No vacuum can then be created in tank 12 during the pumping operation because the manhole structure 15 has been opened. Furthermore, if the lid 28 and bar 24 should inadvertently be moved to their closed position, they will assume the position shown by the dotted lines in FIG. 5 and rest on top of the prongs 54 of fork 52. Thus, the inadvertent closing of lid 28 after the valve 62 has been opened in the manner described will absolutely prevent a vacuum from being created in the tank even then because the outer tips of the prongs 54 will not allow the lid 28 to seal the manhole opening 14.

From the foregoing it is seen that the fluid pumping operation cannot even begin until the manhole cover has been opened and the inadvertent closing of the manhole cover will still not seal the tank and permit a vacuum to be created after the pumping operation has already started. It should also be noted that ice and snow will not readily render my device inoperative and if for any reason a malfunction should occur in my device, it will be immediately known by the operator for he cannot even open the valve 62 unless my device is properly functioning. Thus, it is seen that my device will accomplish at least all of its stated objectives.

Some changes may be made in the construction and arrangement of my vacuum safety device for tanks and the like without departing from the real spirit and purpose of my invention, and it is my intention to cover by my claims, any modified forms of structure or use of mechanical equivalents which may be reasonably included within their scope.

I claim:

1. In combination, a tank adapted to contain fluid, an access opening in the top of said tank, a manhole structure on said tank around said access opening, a lid comprising a part of said manhole structure and adapted to pivot therewith to seal said opening at times, a valve on said tank, actuating means on said valve to selectively open said valve and to remove fluid from said tank at times, an aperture in said actuating means, a bar on said tank adjacent said valve, an aperture on said bar capable of registering with the aperture in said actuating means at times, a cable movably secured to said tank and having one of its ends terminating adjacent the aperture in said bar, a locking pin on the end of said cable adapted to penetrate the aperture in said bar at times, the other end of said cable terminating adjacent said manhole structure, a resilient means secured to said tank and said cable to yieldingly restrain the displacement of said cable toward said valve and away from said manhole structure, a fork element movably secured to the end of said cable and normally abutting said manhole structure immediately adjacent said access opening, said fork element normally compressing said resilient means, said lid engaging said fork element while in a closed condition to releasably hold said fork element in abutting relationship with said manhole structure, said cable being of such length that said locking pin can penetrate the registering apertures in said bar and said actuating means when said fork element is abutting said manhole structure.

2. In combination, a tank adapted to contain fluid, an access opening in the top of said tank, a manhole structure on said tank around said access opening, a lid comprising a part of said manhole structure and adapted to pivot therewith to seal said opening at times, a valve on said tank, actuating means on said valve to selectively open said valve and to remove fluid from said tank at times, an aperture in said actuating means, a bar on said tank adjacent said valve, an aperture on said bar capable of registering with the aperture in said actuating means at times, a conduit secured to said tank, a cable movably mounted within said conduit and having one of its ends terminating adjacent the aperture in said bar, a locking pin on the end of said cable adapted to penetrate the aperture in said bar at times, the other end of said cable terminating adjacent said manhole structure, a resilient means secured to said tank and said cable to yieldingly restrain the displacement of said cable toward said valve and away from said manhole structure, a fork element movably secured to the end of said cable and normally abutting said manhole structure immediately adjacent said access opening, said fork element normally compressing said resilient means, said lid engaging said fork element while in a closed condition to releasably hold said fork element in abutting relationship with said manhole structure, said cable being of such length that said locking pin can penetrate the registering apertures in said bar and said actuating means when said fork element is abutting said manhole structure.

3. In combination, a tank adapted to contain fluid, an access opening in said tank, a closure means adapted for movement with respect to said tank at times for closing said access opening at times to seal said tank, a valve on said tank, actuating means on said valve to selectively open said valve and to remove fluid from said tank, connecting means connecting said actuating means on said valve and said closure means on said tank; said connecting means including a first element adapted to engage said actuating means to hold said valve in a closed position at times, said connecting means also including a second element movable into the movable path of said closure means at other times to prevent the closing of said access opening; said first element being secured to said second element, said first element movable to release said actuating means when said second element moves into the movable path of said closure means whereby said actuating means can then be independently operated to open said valve.

4. The structure of claim 3 wherein a spring is interposed between said tank and said second element to yieldingly urge said second element into the movable path of said closure means.

5. In combination, a tank adapted to contain fluid, an access opening in the top of said tank, a closure means adapted for movement with respect to said tank for closing said access opening at times to seal said tank, a valve on said tank, actuating means on said valve to selectively open said valve and to remove fluid from said tank at times, a locking means on said valve to selectively lock said actuating means in a closed position at times, an elongated hollow conduit on said tank and extending between said valve and said closure means, a flexible cable in said conduit having one of its ends in operative engagement with said locking means, and an element on the other end of said cable with means for moving said element into the movable path of said closure means at other times to prevent the closing of said access opening; said cable being of such length that when said element on one of its ends moves into the movable path of said closure means, the other end of said cable will unlock said locking means whereby said valve can be independently opened.

References Cited in the file of this patent
UNITED STATES PATENTS

| | | |
|---|---|---|
| 1,052,938 | McKeen | Feb. 11, 1913 |
| 1,339,284 | Petrie | May 4, 1920 |
| 1,355,205 | Woodward | Oct. 12, 1920 |
| 1,929,694 | Judsom | Oct. 10, 1933 |
| 2,202,422 | Hoof | May 28, 1940 |
| 2,313,554 | Jones | Mar. 9, 1943 |
| 2,633,141 | Russell | Mar. 31, 1953 |
| 2,648,351 | Curtis | Aug. 11, 1953 |
| 2,718,239 | Erbguth | Sept. 20, 1955 |

FOREIGN PATENTS

| | | |
|---|---|---|
| 725,065 | Germany | Sept. 12, 1942 |